US012078006B2

(12) United States Patent
Baizeau et al.

(10) Patent No.: US 12,078,006 B2
(45) Date of Patent: Sep. 3, 2024

(54) TRIM STRUCTURE FOR A DOOR

(71) Applicant: IMAFORM, Biarritz (FR)

(72) Inventors: Philippe Baizeau, Biarritz (FR); Bernard Brouillet, Saint-Loubes (FR); Charles Ruther, Moliets-et-Maa (FR)

(73) Assignee: IMAFORM, Biarritz (FR)

( * ) Notice: Subject to any disclaimer, the term of this patent is extended or adjusted under 35 U.S.C. 154(b) by 276 days.

(21) Appl. No.: 17/421,814

(22) PCT Filed: Jan. 10, 2020

(86) PCT No.: PCT/FR2020/050032
§ 371 (c)(1),
(2) Date: Jul. 9, 2021

(87) PCT Pub. No.: WO2020/144441
PCT Pub. Date: Jul. 16, 2020

(65) Prior Publication Data

US 2022/0098919 A1 Mar. 31, 2022

(30) Foreign Application Priority Data

Jan. 11, 2019 (FR) ...................................... 1900267

(51) Int. Cl.
*E06B 1/52* (2006.01)
*E06B 1/24* (2006.01)
(Continued)

(52) U.S. Cl.
CPC .................. *E06B 1/52* (2013.01); *E06B 1/24* (2013.01); *E06B 1/32* (2013.01); *E06B 1/34* (2013.01); *E06B 2001/622* (2013.01)

(58) Field of Classification Search
CPC ..... E06B 1/10; E06B 1/24; E06B 1/32; E06B 1/34; E06B 1/52; E06B 2001/622
See application file for complete search history.

(56) References Cited

U.S. PATENT DOCUMENTS 1,440,615 A * 1/1923 Meyercord .......... A47B 96/202 217/65
3,363,387 A * 1/1968 Schwindt ................ E06B 3/723 52/631

(Continued)

FOREIGN PATENT DOCUMENTS

AT 7271 U1 * 4/1972
AT 13730 U1 * 5/2014 .............. E04F 13/06

(Continued)

OTHER PUBLICATIONS

International search report dated Apr. 21, 2020. PCT Application No. PCT/FR2020/050032.

(Continued)

*Primary Examiner* — Jessie T Fonseca
(74) *Attorney, Agent, or Firm* — Perman & Green, LLP

(57) ABSTRACT

A trim structure intended on one hand to receive a door, in particular an internal door, and on the other hand to be joined to a partition. The structure includes two lateral walls facing one another and spaced apart by a thickness. The thickness being adjusted with respect to the thickness of the partition such that the lateral walls form an external surface that is flush with the external surface of the partition when the structure is joined to the partition. A transverse end wall connects the two lateral walls. The transverse end wall includes a planar surface that is configured to butt up against the thickness of a vertical edge face of the door and a projecting element forming a bearing surface for the door. The walls being formed from at least one composite panel, the panel comprising a central layer sandwiched between two facing layers.

12 Claims, 6 Drawing Sheets

(51) Int. Cl.

| | |
|---|---|
| ***E06B 1/32*** | (2006.01) |
| ***E06B 1/34*** | (2006.01) |
| *E06B 1/62* | (2006.01) |

(56) References Cited

U.S. PATENT DOCUMENTS

| | | | | | |
|---|---|---|---|---|---|
| 3,654,053 | A * | 4/1972 | Toedter | A47B 96/202 428/56 |
| 3,729,870 | A * | 5/1973 | Kvalheim | E06B 1/34 49/504 |
| 3,757,473 | A * | 9/1973 | Mundy | E06B 1/10 49/505 |
| 3,890,754 | A * | 6/1975 | Spurdle | E06B 1/34 52/211 |
| 3,981,103 | A * | 9/1976 | McAllister | E06B 1/10 49/505 |
| 4,019,303 | A * | 4/1977 | McAllister | E06B 1/34 52/631 |
| 4,402,170 | A * | 9/1983 | Seidner | E04C 2/405 52/843 |
| 2008/0010919 | A1* | 1/2008 | Tufts | E06B 1/366 52/204.591 |
| 2015/0082717 | A1* | 3/2015 | Stevens | E06B 1/34 52/211 |

FOREIGN PATENT DOCUMENTS

| | | | | |
|---|---|---|---|---|
| DE | 102015106137 | A1 * | 10/2016 | E06B 1/08 |
| GB | 2035057 | | 6/1980 | |
| JP | 2009127265 | | 6/2009 | |
| KR | 20100060117 | A * | 6/2010 | |

OTHER PUBLICATIONS

Japanese Utility Model Application No. S58-102629, cited in JP Office Action dated Jan. 9, 2024 (JP2021-540329).

Japanese Utility Model Application No. S57-44195 (related to JPS51147996A), cited in JP Office Action dated Jan. 9, 2024 (JP2021-540329).

* cited by examiner

TRIM STRUCTURE FOR A DOOR

CROSS-REFERENCE TO RELATED APPLICATIONS

This application is a National Stage of International Application No. PCT/FR2020/050032, having an International Filing Date of 10 Jan. 2020, which designated the United States of America, and which International Application was published under PCT Article 21(2) as WO Publication No. 2020/144441 A1, which claims priority from and the benefit of French Patent Application No. 1900267, filed on 11 Jan. 2019, the disclosures of which are incorporated herein by reference in their entireties.

BACKGROUND

1. Technical Field

The present disclosure relates to a trim structure for a door. More specifically, the present disclosure relates to a trim structure that forms both part of a partition and a vertical upright for accommodating a door. The present disclosure also relates to a method for producing such a trim structure. The present disclosure also relates to a method for fitting such a trim structure in order to form the vertical upright as in the case of a standard doorframe in the opening of a partition and part of the partition. Finally, the present disclosure relates to a doorset comprising a door equipped with such a trim structure. The present disclosure is particularly suitable for installing an interior door in a home in any type of dwelling during the building or renovation of homes.

2. Brief Description of Related Developments

During building or renovation work, partitions are generally used to delineate rooms. In order to move from one room to another, an opening is made in the partition. For the purposes of noise and thermal insulation, an interior door is used to plug the opening. Whatever the type of door, incorporating a door into the partition entails the use of a doorframe, also referred to as a fixed frame or a casing which is a frame intended to accommodate the door.

In a known way, a doorframe is sealed into a wall or into a partition using fixings and constitutes the door surround. It is made of two, one left and one right, vertical uprights arranged one on each side of the opening, of a head and sometimes of a sill. Together with the door, it forms a doorset. One of the uprights comprises a strike plate casing in which the locking bolt of a door with a lock becomes housed. The other upright is equipped with hinge leaves allowing the door to be assembled with the upright and allowing the door to move.

There are various types of partitions having various structures and various thicknesses on which a doorframe can be mounted. One of the types of partition that is very widespread in the field of building and renovation is a partition made up of composite panels fixed to a metal framework, Each composite panel has a structure formed of two facings separated by a central layer. The facing may comprise one or more sheets which are generally made of a material such as cardboard or PVC (polyvinyl chloride). The central layer or core may be made from any type of material such as plaster, foam, cardboard or cement. This partition is particularly suitable for delineating spaces within a home. Furthermore, it is very easy to create an opening in such a partition. The present disclosure applies specifically to the case of this type of partition made up of sheets of cardboard or of PVC separated by a central layer.

In the remainder of the description, the term "partition" refers to a partition made up of such composite panels.

There are various doorframe and fitting solutions proposed according to the material of the door and the composition of the wall.

In the case of a partition, the doorframe system known from the prior art consists of surrounding the partition and there are chiefly two fitting techniques used according to the type of doorframe selected.

FIG. 1A depicts a first aspect of doorframe 1 of the prior art, which entails what is known as a "traditional" fitting. Such doorframe fitting is performed before or during the erection of the partition.

This FIG. 1A depicts a partition 3 comprising an opening plugged by a door 7. A vertical upright 2 is fitted to each end of this partition 3. The upright has a longitudinal profile of substantially U-shaped cross section comprising two lateral branches and a base. The U-shaped upright surrounds the partition 3 with the two lateral branches bearing against the lateral walls of the partition and the base bearing against the vertical edge face of the partition, the width of the space between the two branches being substantially identical to the thickness of the partition. The base has a face for assembling with the door. This face comprises a protrusion acting as a stop when the door 7 is being closed.

Such a doorframe, generally made of wood, has the disadvantage of not being very aesthetic because of the presence of the vertical uprights which project with respect to the partition and with respect to the door.

Furthermore, as illustrated in FIG. 1A, the width of the doorframe is fixed and has to be selected according to the thickness of the partition. Thus, during on-site work, it is necessary to have a multitude of doorframe types to hand, because of the various thicknesses of partition.

Finally, the fact that the material used for the doorframe is different than that of the partition leads to problems of expansion caused by changes in temperature and can therefore cause cracks to appear at the join between the partition of the doorframe, thus weakening the partition.

FIG. 1B depicts a second aspect of standard doorframe. Such a doorframe is installed when all the other work, such as the partitions and the floor, is complete. This is the so-called "second-fix" technique.

The doorframe comprises a first part referred to as the jamb lining 4 and a second part referred to as the jamb trimming 5, the latter collaborating with the jamb lining to allow the doorframe to be adapted to suit the thickness of the partition. As in the aspect of FIG. 1A, the jamb lining and the jamb trimming form an upright of U-shaped cross section into which the partition 3 is set. A reinforcing layer 8 may be interposed between an edge face of the partition and the upright. The jamb lining has an assembly free face comprising a protrusion 6 acting as a stop when the door 7 is being closed.

The fitting method is as follows. The jamb lining is fitted first of all into the opening in the partition, against the partition. The jamb lining is then fixed by screws. The jamb trimming is then coated with glue and set into the jamb lining.

Such a doorframe allows the thickness of the doorframe to be adjusted according to the thickness of the partition. However, it still has the disadvantage of being somewhat inaesthetic because of the presence of the uprights which project with respect to the partition and with respect to the door.

Furthermore, the material used to make the doorframe, generally wood, is therefore different than that used for the partition. As a result, the risk of cracks appearing as a result of thermal expansion still remains at the join between the partition and the doorframe.

As FIGS. 1A and 1B illustrate, the doorframe of the prior art has the disadvantage of being inaesthetic because of the additional thickness formed by the vertical uprights of the doorframe with respect to the partition. In order to render the doorframe invisible, one technique often consists in painting it the same color as the partition, but that does not make the difference in level between the doorframe and the partition disappear.

Furthermore, renewing a doorframe of the prior art is very difficult and expensive because the doorframe set into the partition has to be removed.

Finally, the different materials used for the partition and the standard doorframe may cause cracks in the partition as a result of thermal expansion at the join between the partition and the doorframe.

SUMMARY

It is an object of the present disclosure to propose a novel trim structure which makes it possible to improve the aesthetic appearance of the assembly by making it discrete or even invisible within the décor of a room while at the same time improving the structural and mechanical quality of its incorporation into the partition. Furthermore, this novel trim structure makes it possible to simplify the fitting of a door and thus save on the duration and cost of site work. Finally, the novel trim structure, by being made from the same material as the adjacent partitions, makes it possible to eliminate the problems of thermal expansion that could give rise to cracking in the walls.

To this end, there is proposed a trim structure intended on the one hand to accommodate a door, notably an interior door and, on the other hand, to be assembled with a partition, which structure comprises:

- two opposing lateral walls spaced apart by a thickness (e1), said thickness being adjusted according to the thickness (e2) of the partition so that said lateral walls form an exterior surface that is flush with the exterior surface of the partition when the structure is assembled with the partition;
- a transverse end wall connecting the two lateral walls;
- said transverse end wall comprising a planar surface configured to border the thickness of a vertical edge face of the door and a projecting element forming a bearing surface for the door;
- said walls being formed from at least one composite panel, said panel comprising a central layer sandwiched between two layers of facing.

As a preference, and when the partition is formed of composite panels, the composite panel used to form the trim structure is identical to the composite panel used to form the partition.

As a preference, said layer of facing comprises at least one sheet of cardboard or of polyvinyl chloride.

According to one advantageous aspect of the disclosure, said structure is as a single piece, formed from a composite panel.

According to a second aspect of the disclosure, said structure is formed from two composite panels:

- a first panel forming the first lateral wall and the projecting element;
- a second panel forming the second lateral wall and the planar surface.

According to this second aspect of the disclosure, it comprises a fixing piece, an interior side of the planar surface and an interior side of the projecting element being fixed to the fixing piece in order to hold the two panels together.

As a preference, the planar surface and the projecting element form a right angle.

Advantageously, the trim structure comprises at least one reinforcing piece placed inside a space E formed by the two lateral walls and the transverse end wall.

As a preference, said central layer is made of plaster, cardboard, foam or cement.

The present disclosure also relates to a method for manufacturing a trim structure as defined hereinabove, comprising the following steps:

- supplying at least one composite panel;
- making four V-shaped chamfers in said at least one composite panel, said chamfers being parallel to a longitudinal edge of said composite panel;
- applying glue in the chamfers;
- bending along the four chamfers and gluing along the chamfers to form the first lateral wall, the second lateral wall, the planar surface and the projecting element.

According to one aspect of the disclosure, with the trim structure comprising two panels, said method comprises the following steps:

- supplying a first composite panel;
- making two V-shaped chamfers in the first panel, said chamfers being parallel to a longitudinal edge of said first panel;
- applying glue in the two chamfers;
- bending along the two chamfers and gluing along the two chamfers to form the first lateral wall and the projecting element;
- supplying a second composite panel;
- making a V-shaped chamfer in the second panel, said chamfer being parallel to a longitudinal edge of said panel;
- applying glue in the chamfer;
- bending along the chamfer and gluing along the chamfer to form the second lateral wall and the planar surface.

As a preference, the chamfers are made at 45° by making a cut of V-shaped cross section without cutting into the lateral wall that is intended to form the exterior surface of the trim structure.

As a preference, the method of manufacture further comprises an additional step:

- supplying a fixing piece;
- gluing an interior side of the planar surface and an interior side of the projecting element to the fixing piece in order to hold the two panels together.

The present disclosure also relates to a doorset comprising at least one trim structure according to the disclosure and a door, whereby the transverse end wall of the trim structure is assembled with a vertical edge face of the door.

As a preference, the transverse end wall of the trim structure comprises hinge leaves for assembling the door with the trim structure and allowing it to move.

As a preference, the transverse end wall of the trim structure comprises a housing to accept a door locking bolt.

One subject of the present disclosure is a method for fitting a trim structure formed from one composite panel or from two composite panels assembled with one another by a fixing piece to form at least part of a lateral partition and an upright to receive a door, said method comprising the following steps:

installing vertical uprights and horizontal rails to form at least a metal framework intended to form a lateral partition, a metal vertical upright and one end of the horizontal rails of the metal framework delimiting one side of an opening (O);

surrounding the metal framework with the trim structure so that the lateral walls bear against the metal framework to form, respectively, a first exterior surface and a second exterior surface of a lateral partition and a side of the transverse end wall bearing against the metal vertical upright and the ends of the horizontal rails;

fixing the trim structure to the metal framework.

The present disclosure also relates to a method for fitting a trim structure comprising two non-assembled composite panels to form at least part of a lateral partition and an upright to receive a door, said method comprising the following steps:

installing vertical uprights and horizontal rails to form at least a metal framework intended to form a lateral partition, a metal vertical upright and one end of the horizontal rails of the metal framework delimiting one side of an opening (O);

supplying a first composite panel comprising a first lateral wall and a projecting element;

fixing the first lateral wall to the metal framework to form a first exterior surface of the lateral partition and fixing an interior side of the projecting element to the metal framework;

supplying a second composite panel comprising a second lateral wall and a planar surface;

fixing the second lateral wall to the metal framework to form a second exterior surface of the lateral partition and fixing an interior side of the planar surface to the metal framework.

As a preference, a fixing piece is interposed between the interior side of the projecting element and the interior side of the planar surface, the interior side of the projecting element and the interior side of the surface being fixed to the metal framework via the fixing piece.

BRIEF DESCRIPTION OF THE DRAWINGS

Other features, details and advantages of the present disclosure will become apparent from reading the detailed description below and from studying the attached drawings, in which.

DETAILED DESCRIPTION

Figure 1A:
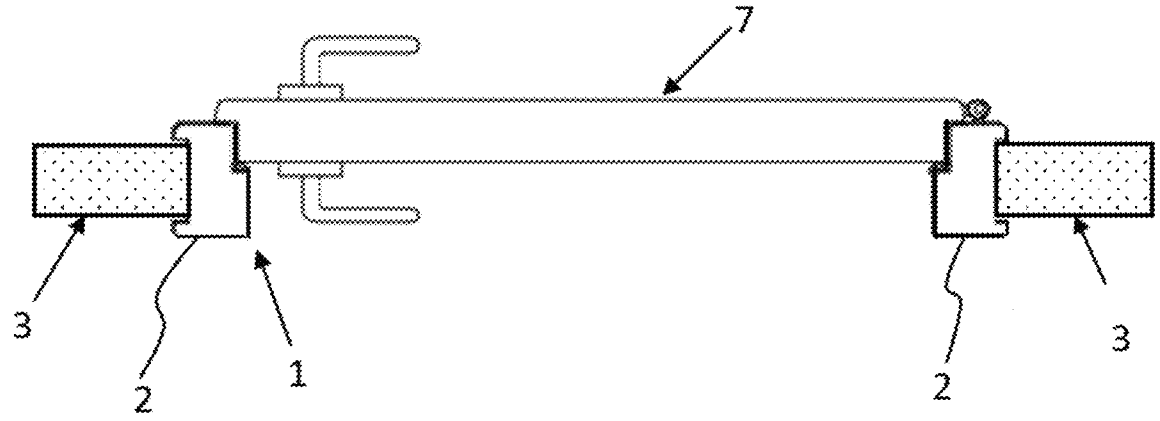
FIG. 1A depicts a view from above and in section of a doorframe designed for traditional fitting of the prior art.
Figure 1B:
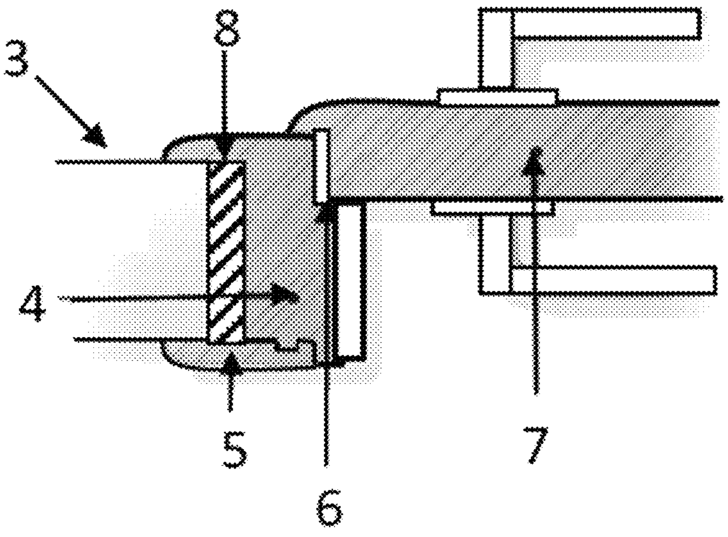
FIG. 1B depicts a view from above and in section of a doorframe comprising a jamb lining and a jamb trimming for so-called second-fix fitting of the prior art.

The drawings and the description below contain, essentially, elements the nature of which is certain. They can therefore serve not only to better understand the present disclosure, but also to contribute to the definition thereof, where applicable.

For the sake of clarity, one and the same numerical reference is used for FIGS. 2 to 6 to denote one and the same element of the trim structure according to the disclosure.

The present disclosure relates to a trim structure intended to be assembled with a partition and to receive a door, notably an interior door.

For the remainder of the description, the term "partition" refers to any type of building partition wall or wall delimiting a space.

Throughout the application, the term "interior" refers to an element of the trim structure that is not visible and the term "exterior" refers to an element of the trim structure that is visible. The terms "upper" and "lower" are to be understood with reference to the arrangement of the trim structure with respect to the floor on which it is mounted.

According to one aspect of the disclosure, which aspect is described hereinafter with reference to FIGS. 2 and 3, the trim structure 10 comprises a first lateral wall 11 and a second lateral wall 12. The two walls are spaced apart by a thickness e1. The two walls 11, 12 are connected by a transverse end wall 13. The transverse end wall makes a right angle with the first wall and the second wall.

Figure 4:
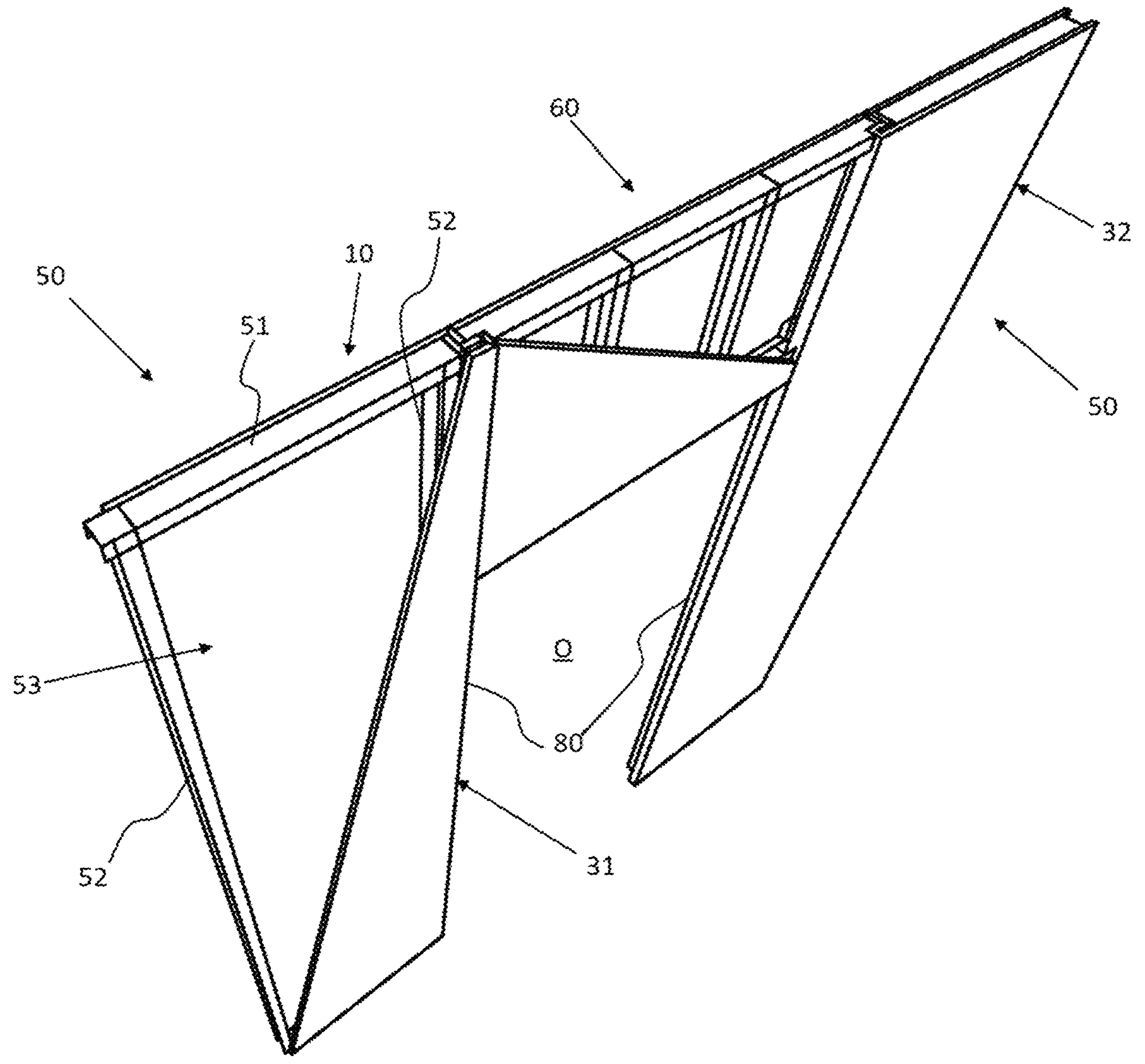
FIG. 4 depicts a perspective view in partial section of two trim structures of FIG. 2 positioned one on each side of an opening to form the left and right lateral uprights to accept a door and a portion of the lateral partition, the two trim structures being mounted on a metal framework and assembled with a partition positioned in the upper part of the opening.

This trim structure 10 is intended to be fixed to a metal framework delimiting an opening O as illustrated in FIG. 4 to form, on the one hand, a portion of a partition 30, 31, 32 and, on the other hand, a vertical upright 80 intended to receive an interior door.

According to one advantageous feature of the disclosure, the two walls of the trim structure 10 are spaced apart by a thickness e1 which is equal to that of the partition e2 adjacent to the trim structure. Thus, when the trim structure is mounted on a metal framework 50, the exterior surfaces of the two walls lie flush with that of the adjacent partition. In general, the standard thicknesses for a partition measure 50, 72 or else 98 mm.

The transverse end wall 13 has an interior face oriented toward the adjacent partition 30 and an exterior face oriented toward the door 70. The exterior face comprises a planar surface 14 and a projecting element 15, the projecting element 15 making a right angle with the planar surface 14. As illustrated in FIGS. 2 and 3, the planar surface 14 has a thickness b1 which is equal to the thickness of the door b2, which is generally comprised between 29 and 40 mm. Thus, when the trim structure receives the door, the planar surface 14 borders the edge face of the door while the projecting element 15 forms a bearing surface for the door when the door is closed. More specifically, the projecting element 15 has a first exterior side 15*a* and a second exterior side 15*a*'. The first exterior side 15*a* constitutes a stop surface for the door. The second side 15*a*' has a thickness c1. The total thickness of the transverse end wall (b1+c1) is equal to the thickness of the trim structure e1. Thus, during site work, it is possible to vary the thickness b1 of the planar surface according to the thickness b2 of the door and the thickness c1 of the second side 15*a*' in order to adapt the total sum of the thicknesses b1+c1 with respect to the thickness e2 of the partition adjacent to the structure 30.

Figure 2:
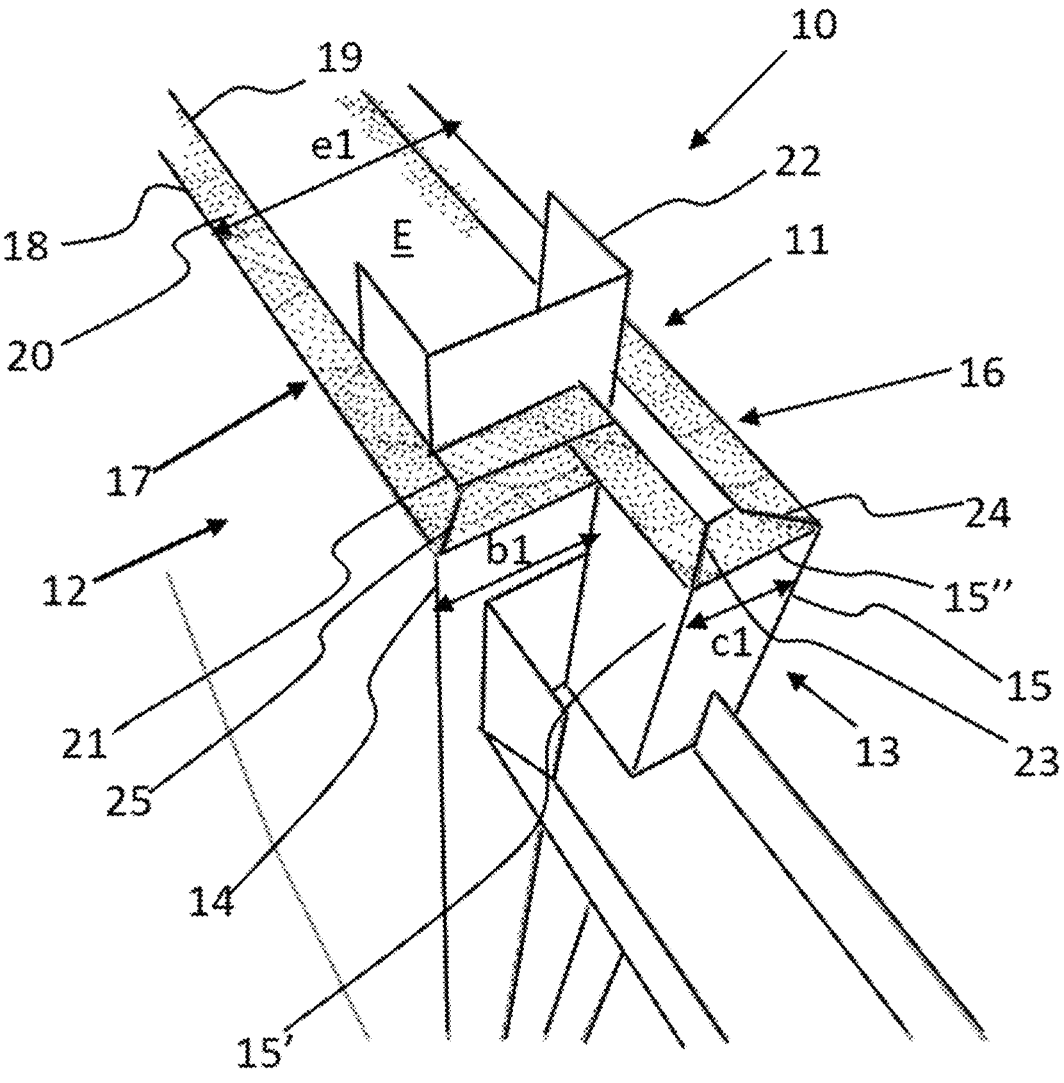
FIG. 2 depicts a perspective view of a trim structure according to one aspect of the disclosure.
Figure 3:
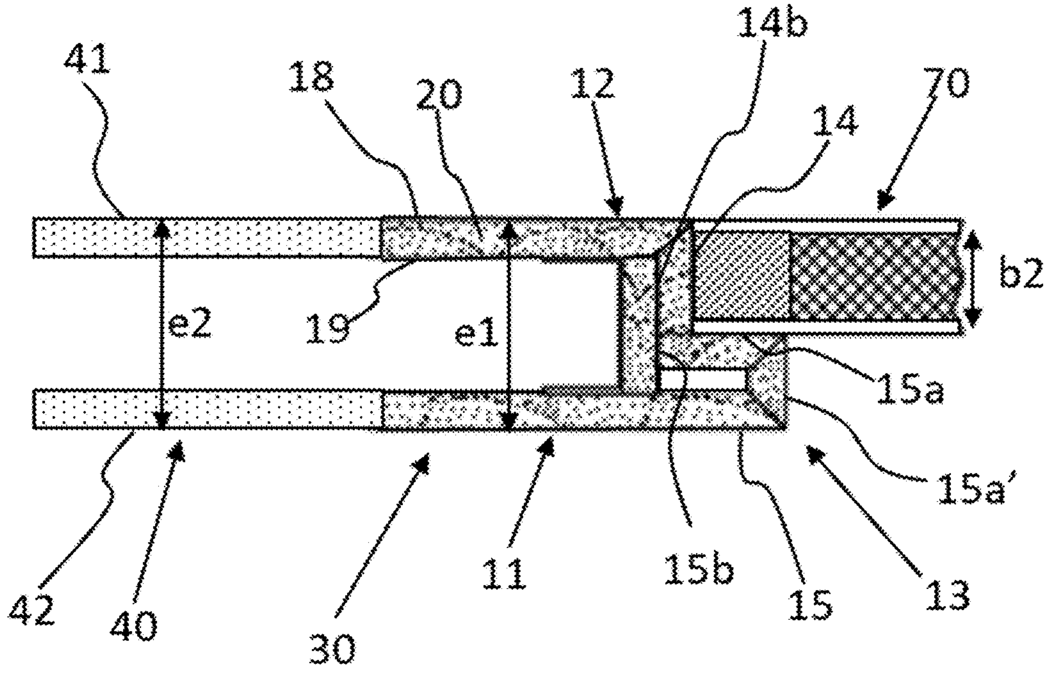
FIG. 3 depicts a view from above and in transverse section of the trim structure of FIG. 2 fitted to the lateral end of a partition and accepting a door.

As depicted in FIGS. 2 and 3, the two lateral walls 11, 12 extend perpendicularly directly from the ends of the transverse end wall 13 without interruption. Thus, part of the lateral wall 11 is formed by an exterior side of the projecting element which does not make a right angle with the planar surface.

Thus, when the trim structure according to the disclosure is mounted on a metal framework of an opening, the lateral walls 11, 12 form part of the partition 30 and the transverse end wall 13 forms one of the vertical uprights to receive the door. The lateral walls 11, 12 form a visible part of the trim structure and the transverse end wall 13 forms a part that is not visible when the door is closed. The fact that the lateral walls 11, 12 form an exterior surface that lies respectively flush with the two exterior surfaces 41, 42 of the adjacent partition 40 offers an aesthetic advantage over the doorframes of the prior art. Specifically, once the finishing work on the lateral walls of the trim structure and the adjacent partition has been completed, the trim structure becomes invisible.

According to one particularly advantageous technical feature of the disclosure, the trim structure 10 is preferably made from the same material as that of the adjacent partition, namely composite panels. Within the meaning of the present application, a composite panel is a panel comprising two facings separated by a central layer. The facing may comprise one or more sheets which are generally made from a material such as cardboard or PVC (polyvinyl chloride). The central layer or core may be made from any type of material such as plaster, foam, cardboard or cement. Such a composite panel offers the advantage of being a material that is lightweight, easy to handle and to install, and low in cost. The fact that the lateral walls of the trim structure are made from the same material as the adjacent partition makes it possible to eliminate the problems of thermal expansion in the region of the join between the trim structure and the partition and thus avoid the appearance of cracks which could weaken the partition.

The trim structure is formed of one or more composite panels assembled and fixed together.

In the aspect illustrated in FIG. 2, the trim structure comprises a first composite panel 16 and a second composite panel 17.

The first panel 16 forms the first lateral wall 11 and the projecting element 15. The projecting element is formed from a longitudinal edge of the first panel 16. What are notably formed are a first part 15' and a second part 15" of the projecting element 15, these being formed by, respectively, a first folding 23 and a second folding 24 of the longitudinal edge of the first panel toward a face of the composite panel 16 forming the interior surface of the lateral wall 11. The first part 15' makes a right angle with the second part 15" and the second part 15" with the rest of the panel that forms the first lateral wall 11.

The second panel 17 forms the second lateral wall 12 and the planar surface 14. The planar surface 14 is formed from a longitudinal edge of the second panel 17, In particular, the planar surface 14 is formed from a fold 25 and forms a right angle with the rest of the second panel 17 that forms the second lateral wall 12.

The first panel 16 and the second panel 17 are assembled and fixed together via a fixing piece 21. This fixing piece 21 is preferably also made from the same material as the composite panels that form the trim structure, for example two sheets of cardboard spaced apart by a plaster or cardboard core. The fixing piece 21 has a substantially parallelepipedal shape. The interior side **14*b* of the planar surface and the interior side 15*b* of the projecting element are fixed to one side of the fixing piece 21** oriented toward the door. This fixing is performed using conventional fixing means using screws or gluing.

According to one aspect of the disclosure which is not illustrated in the figures, the trim structure 10 may be in one piece and formed from a single composite panel. The transverse end wall is then formed for example from four folds along four 45° chamfers produced by making a cut of V-shaped cross section in a composite panel.

Depending on the requirements and the use of the room within the home, the trim structure may further comprise at least one metal reinforcing piece 22 positioned inside the space E formed by the two lateral walls 11, 12 and the transverse end wall 13. This metal reinforcing piece has a U-shaped cross section. The base of the reinforcing piece is for example fixed to a side of the fixing piece 21 that is oriented toward the adjacent partition. The two lateral branches of the reinforcing piece are fixed to the lateral walls 11 and 12.

It is also possible to cover at least one of the sheets of the composite panel of the trim structure with a reinforcing layer in order to make the composite panel more rigid.

The fact that the trim structure is made from composite panels like the adjacent partition allows a doorframe to be formed that is discrete, or even invisible, thus offering an aesthetic advantage over the prior art. Moreover, this trim structure also makes it possible to simplify the fitting. Specifically, all that is required is for the trim structure to be fixed to a metal framework by screws as is the case with the fitting of a standard partition.

The trim structure may form vertical uprights suitable for a door with a square edge or a rebated door.

A method for manufacturing a trim structure comprising two composite panels will be described hereinabove.

The method for manufacturing a trim structure comprises the following steps.

The first lateral wall 11 and the projecting element 15 for example are formed in a first composite panel 16. Two 45° V-shaped chamfers are made in the first panel, the two chamfers being parallel to a longitudinal edge of said first panel. To do that, two cuts with a V-shaped cross section are made in the composite panel. As a preference, the chamfers are formed without cutting into the lateral wall that is intended to form the exterior surface of the trim structure. Thus, the exterior surface of the panel remains a plain one-piece surface. Glue is applied in the two chamfers and the panel is folded along the two chamfers to glue along the two chamfers and form the first lateral wall 11 and the projecting element 15.

The second lateral wall 12 and the planar surface 14 are formed in a second composite pan& 17. A 45° V-shaped chamfer is made in the second panel, the chamfer being parallel to a longitudinal edge of said second panel. To do that, a cut with a V-shaped cross section is made in the composite panel without cutting into the lateral wall that is intended to form the exterior surface of the structure. Glue is applied in the chamfer and the panel is folded along the chamfer to glue along the chamfer and form the first lateral wall 12 and the planar surface 14.

According to one embodiment of the disclosure, the two panels are then assembled and fixed together using a fixing piece 21 using gluing or screwing. In particular, an interior side **14*b* of the planar surface 14 and an interior side 15*b* of the projecting element 15 are fixed to one side of the fixing piece 21** to hold the two panels together.

In a variant, the two panels are not assembled at the time of manufacture but are fixed together at the time of fitting of the trim structure to a metal framework. It is thus possible to adjust the thickness e1 formed by the two lateral walls of the trim structure according to the thickness of the adjacent partition 40.

Although this has not been depicted in the figures of the present application, the trim structure and particularly the transverse end wall may comprise at least one housing to accept a strike plate casing to accept a door locking bolt or hinge leaves for assembling the door to the trim structure and allowing the door to move.

Figure 5:
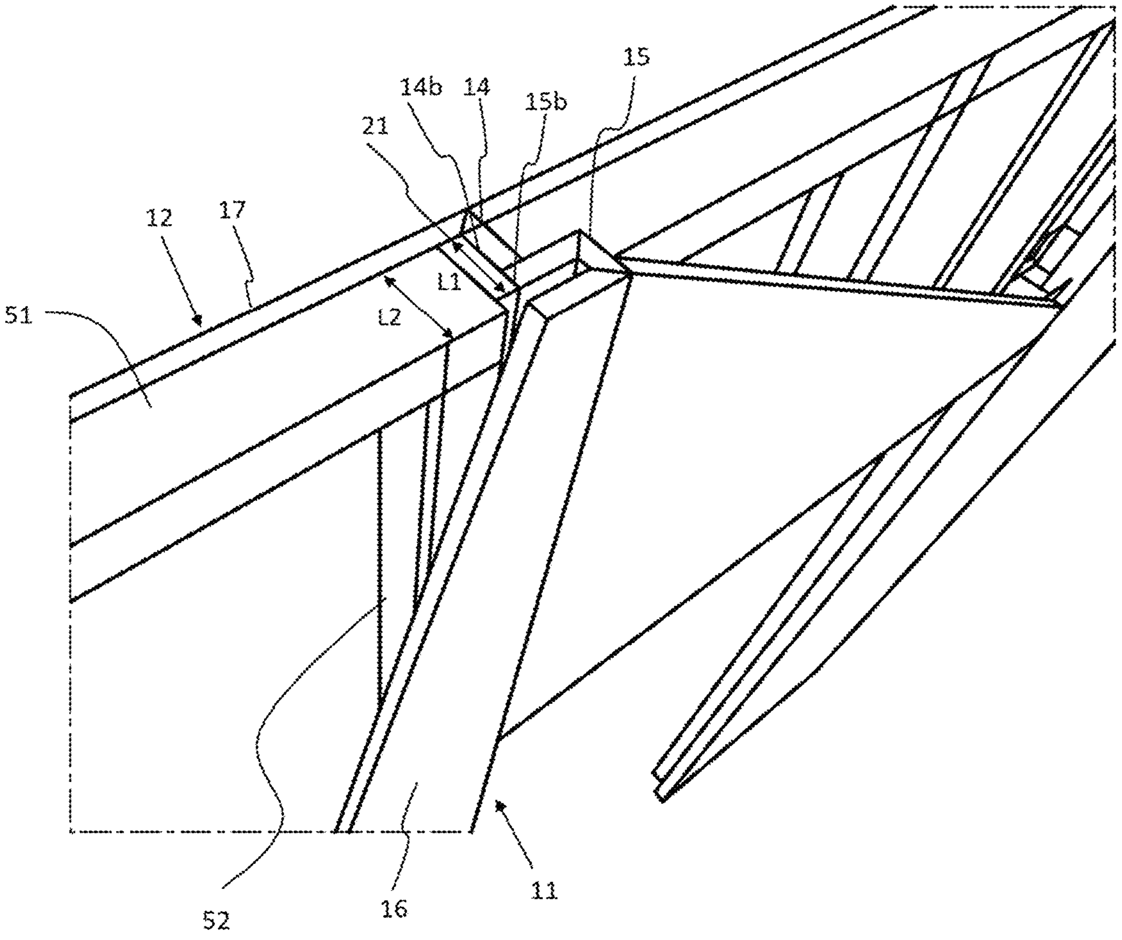
FIG. 5 depicts an enlarged view of FIG. 4 in the region of the connection between the trim structures and the end of the upper partition.

The method for fitting a trim structure of the disclosure will now be described hereinabove with reference to FIGS. 4, 5 and 6 to form, on the one hand, a partition of an opening and, on the other hand, a vertical upright to accommodate a door.

As illustrated in FIG. 4, a first lateral partition 31 formed by a first trim structure, a second lateral partition 32 formed by a second trim structure and an upper partition 60 delimit an opening O intended to be closed by a door 70.

In order to erect the lateral partitions 31, 32, a metal framework 50 is first of all formed for each trim structure. Each metal framework comprises by way of example, as in the case of a standard framework, two metal vertical uprights 52, a metal horizontal rail and a lower horizontal rail 51. The opening O is delimited by two metal vertical uprights 52. As in the case of the erection of a conventional partition, the void between the two composite panels that are going to form the trim structure allows equipment to be built in and may be filled with thermal and acoustic insulating material 53.

According to a method for fitting the trim structure of the disclosure, the assembling of the trim structure is performed while it is being fitted to the metal framework.

A first composite panel 16 is provided which comprises a lateral wall 14 and a projecting element 15. The first composite panel is then fixed to the metal framework by fixing the first lateral wall 11 to the metal framework using screws to form a first exterior surface of the partition and to fix an interior side 15*b* of the projecting element 15 to the metal framework, namely one end of the horizontal rails 51 and the vertical upright 52, using fixing means.

A second composite panel 17 comprising a second lateral wall 12 and a planar surface 14 is provided. The second lateral wall is fixed to the metal framework to form a second exterior surface of the lateral partition and to fix an interior side 14*b* of the planar surface 14 to the metal framework, namely one end of the horizontal rails 51 and the vertical upright 52.

The transverse end wall 13 comprising the planar surface and the projecting element acts as a vertical upright 80 as in the case of a standard doorframe and may comprise a strike plate casing to accept a locking bolt of the door 70.

In order to form the second lateral partition 32 and the second vertical upright 80, an almost identical second trim structure is fitted to the metal framework in the same way as the first trim structure. The transverse end wall of the trim structure in the example illustrated in FIG. 6 comprises hinge leaves for assembling the door with the upright and allowing the door to move. Thus, the door can pivot about the hinges with one edge of the door bordered by the planar surface 14 and one edge of the door coming into abutment against the projecting element 15 when the door is being closed.

An upper metal framework 60 is then put up. As in the case of the metal frameworks for the lateral partitions, the upper metal framework 60 is made up of vertical uprights and of horizontal rails. The upper and lower rails positioned facing the transverse end walls have an end the cross section of which is shaped to complement the shape of the transverse end wall of the trim structure. When the upper framework is assembled with the trim structures, the ends of these horizontal rails bear against the transverse end wall. A composite panel is then fixed to each side of this upper metal framework to form the two exterior surfaces of the upper partition 33. As illustrated in FIG. 6, the partition 31, 32 formed by the trim structure has exterior surfaces that are flush with the upper partition.

Figure 6:
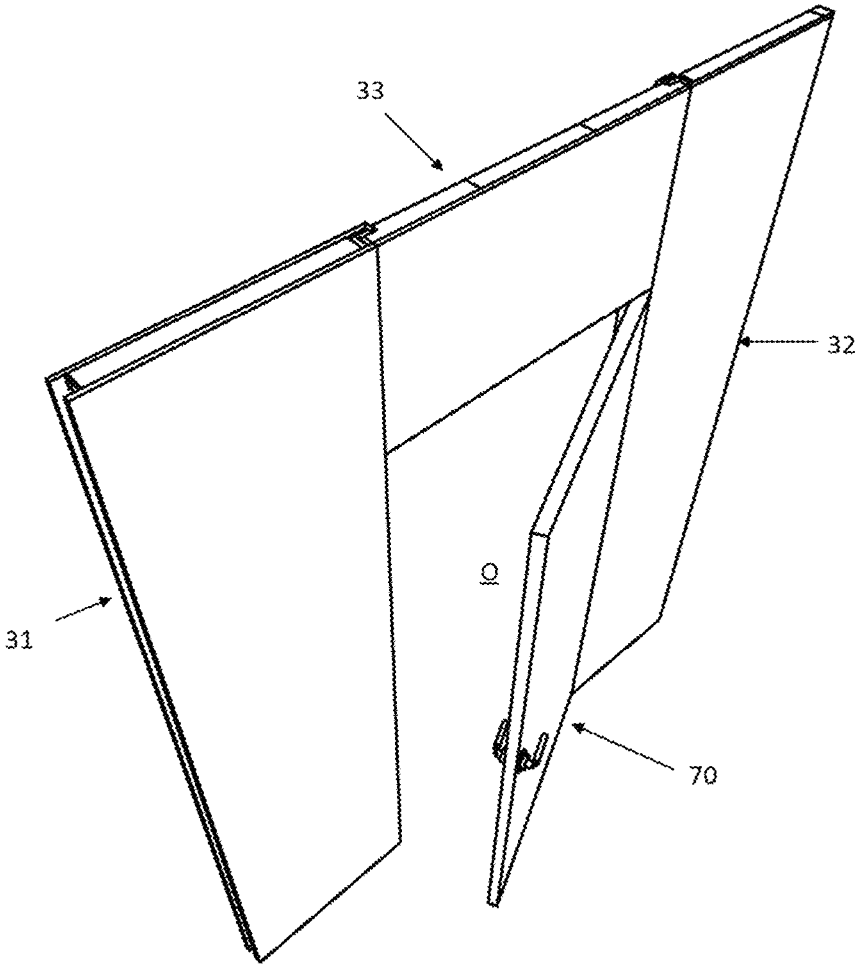
FIG. 6 depicts a perspective view of FIG. 4 with the door integrated into the opening.

Although this is not illustrated in FIG. 6, and in instances in which standard lateral partitions 40 are fitted adjacent to the partitions 31, 32 formed by the trim structures, the exterior surfaces of the partitions 31, 32 are also flush with the exterior surfaces of the standard adjacent lateral partitions.

In a variant, a fixing piece 21 is interposed between the metal framework and an interior side of the transverse end wall 13. The fixing piece 21 is a parallelepipedal component fixed mainly to the vertical upright 52 and one end of the horizontal rail 51. The width L1 of the fixing piece is substantially equal to the width L2 of the horizontal rail. The interior side of the planar surface 14*b* and the interior side 15*b* of the projecting element are fixed to the fixing piece instead of being fixed directly to the metal framework.

According to another method for fitting a trim structure of the disclosure, the trim structure is a structure in a single piece formed from a composite panel or a structure that has already been assembled before being fitted to the metal framework. For that, the two composite panels are first of all assembled and fixed together using the fixing piece 21.

Next, the first metal framework is surrounded by a first trim structure so that the lateral walls 11, 12 come to bear against the metal framework to form, respectively, a first exterior surface and a second exterior surface of the first lateral partition 31 and one side of the fixing piece 21 bearing against the metal vertical upright of the opening. The trim structure is then fixed to the metal framework using known fixing means.

To form the second lateral partition 32 and the vertical upright of the doorframe, an almost identical trim structure is fitted to the metal framework in the same way as for the first trim structure, surrounding the metal framework with the trim structure.

Thus, the trim structure according to the disclosure once fitted allows the parts that act as a doorframe for receiving the door, namely the vertical uprights, to be rendered invisible, thus improving the aesthetic appearance. Furthermore, the fact that it is made from the same material as the adjacent partitions makes it possible to improve the overall strength of the assembly formed by the doorframe and the partition with regard to problems of thermal expansion. Furthermore, the novel trim structure is able to adapt to existing fitting techniques: traditional fitting or second-fix fitting, according to the user's desires.

Furthermore, the fact that the trim structure forms both part of the partition and one of the vertical uprights of the doorframe also allows on-site work to be simplified and allows the cost of the work to be reduced.

The fact that the trim structure is made from composite panels also makes it possible to reduce costs by comparison with a traditional wooden doorframe.

Industrial Application

The trim structure of the disclosure may be applied in any field concerned with the building and renovation of homes in any type of dwelling in which it is necessary to install a door in order to pass between two rooms. The present disclosure is particularly suitable for incorporating an interior door.

The disclosure is not restricted to the examples described hereinabove; features of the illustrated examples may notably be combined with one another in variants which have not been illustrated.

What is claimed is:

1. A trim structure to accommodate a door, and to form a part of a partition, the trim structure comprises:

two opposing lateral walls spaced apart by a thickness, said thickness being adjusted according to the thickness of the partition so that said lateral walls form an exterior surface that is flush with the exterior surface of the partition when the trim structure is assembled with the partition;

a transverse end wall connecting the two lateral walls;

said transverse end wall comprising a planar surface configured to border the thickness of a vertical edge face of the door and a projecting element forming a bearing surface for the door;

said lateral walls being formed from at least one composite panel, said at least one composite panel comprising a central layer sandwiched between two layers of facing, wherein the lateral walls form a part of the partition;

wherein opposing exterior surfaces of the lateral walls are coplanar with the partition.

2. The trim structure as claimed in claim 1, wherein, with the partition being formed of composite panels, each composite panel used to form the trim structure is identical to the composite panels used to form the partition.

3. The trim structure as claimed in claim 1, wherein said layers of facing comprises at least one sheet of cardboard or of polyvinyl chloride.

4. The trim structure as claimed in claim 1, wherein said trim structure is a single piece, formed from the at least one composite panel, the at least one composite panel comprising one composite panel.

5. The trim structure as claimed in claim 1, characterized in that said trim structure is formed from the at least one composite panel, the at least one composite panel comprising two composite panels:

a first composite panel of the two composite panels forming the first lateral wall and the projecting element;

a second composite panel of the two composite panels forming the second lateral wall and the planar surface.

6. The trim structure as claimed in claim 5, wherein the trim structure comprises a fixing piece, an interior side of the planar surface and an interior side of the projecting element being fixed to the fixing piece in order to hold the two panels together.

7. The trim structure as claimed in claim 1, wherein the planar surface and the projecting element form a right angle.

8. The trim structure as claimed in claim 1, wherein the trim structure comprises at least one reinforcing piece placed inside a space formed by the two lateral walls and the transverse end wall.

9. The trim structure as claimed in claim 1, wherein said central layer is made of plaster, cardboard, foam or cement.

10. A doorset comprising at least one trim structure as claimed in claim 1 and a door, wherein the transverse end wall of the trim structure is assembled with a vertical edge face of the door.

11. The doorset as claimed in claim 10, wherein the transverse end wall of the trim structure comprises hinge leaves for assembling the door with the trim structure and allowing it to move.

12. The doorset as claimed in claim 10, wherein the transverse end wall of the trim structure comprises a housing to accept a door locking bolt.

* * * * *